United States Patent [19]
Ahlquist et al.

[11] Patent Number: 6,112,982
[45] Date of Patent: Sep. 5, 2000

[54] EQUIPMENT FOR COATING PHOTOGRAPHIC MEDIA

[75] Inventors: Gary W. Ahlquist, Webster; Thomas J. Clifford, Jr., Rochester; Andrew Zwickl, Jr., Penfield; Bruce G. Rockey, Rochester; Donald D. Eggleston, Rochester; Walter W. Jacobe, Rochester, all of N.Y.

[73] Assignee: Eastman Kodak Company, Rochester, N.Y.

[21] Appl. No.: 09/087,015

[22] Filed: May 29, 1998

[51] Int. Cl.[7] .................................................. G06F 17/00
[52] U.S. Cl. ...................... 235/375; 235/462.01; 235/454; 235/468; 235/492.01; 347/251; 347/232
[58] Field of Search ............................... 235/462.01, 375, 235/376, 466, 454, 468, 469, 455, 492, 491, 476; 347/251, 232

[56] References Cited

U.S. PATENT DOCUMENTS

| | | | |
|---|---|---|---|
| 3,603,675 | 9/1971 | Woodruff | 352/56 |
| 3,801,324 | 4/1974 | Postal | 96/82 |
| 3,909,171 | 9/1975 | Weber et al. | 425/135 |
| 4,308,327 | 12/1981 | Bird et al. | 430/15 |
| 4,637,712 | 1/1987 | Arnold et al. | 355/75 |
| 4,695,854 | 9/1987 | Cruz Uribe | 346/140 |
| 4,967,222 | 10/1990 | Nitsch | 354/321 |
| 5,051,779 | 9/1991 | Hikawa | 355/200 |
| 5,128,519 | 7/1992 | Tokuda | 235/375 |
| 5,164,574 | 11/1992 | Ujiie et al. | 235/462.01 |
| 5,206,490 | 4/1993 | Petigrew et al. | 235/462.01 |
| 5,268,563 | 12/1993 | Takenaka | 235/462.01 |
| 5,317,139 | 5/1994 | Evans et al. | 235/462.01 |
| 5,432,580 | 7/1995 | Tokuda | 354/298 |
| 5,532,773 | 7/1996 | Shaw et al. | 353/26 |
| 5,729,777 | 3/1998 | Saito et al. | 396/311 |
| 5,737,650 | 4/1998 | Debesis et al. | 396/285 |
| 5,801,067 | 9/1998 | Shaw et al. | 438/15 |
| 5,812,178 | 9/1998 | Yamaguchi | 347/251 |
| 5,889,083 | 3/1999 | Zhu | 523/161 |
| 5,925,431 | 7/1999 | Schoenfelder | 428/40.1 |

*Primary Examiner*—Karl D. Frech
*Assistant Examiner*—Daniel S. Felten
*Attorney, Agent, or Firm*—Clyde E. Bailey, Sr.

[57] ABSTRACT

Equipment (100) for coating photographic media (14), such as photographic film and paper, has an apparatus (10) for printing bar code indicia (12) on a moving photographic media and a printer means for printing human readable indicia (16) on the media. The printer (20*a*, 20*b*) moves into print position along a lateral edge (28) of the media (14) in response to input signals received from a controller (22) having computer readable medium for directing the printing and movements of the printer (20*a*, 20*b*).

6 Claims, 5 Drawing Sheets

EQUIPMENT FOR COATING PHOTOGRAPHIC MEDIA

CROSS REFERENCE TO RELATED APPLICATIONS

This application is related to commonly owned U.S. application Ser. No. 09/059,719, filed Apr. 7, 1998, entitled APPARATUS AND METHOD FOR READING BAR CODES ON A MOVING WEB, by Gary W. Ahlquist, Thomas J. Clifford, Jr., and Andrew Zwickl, Jr.; and U.S. application Ser. No. 09/070,258, filed Apr. 30, 1998, entitled APPARATUS AND METHOD FOR PRINTING BAR CODE INDICIA ON A MOVING WEB, by Gary W. Ahlquist, Thomas J. Clifford, Jr., Andrew Zwickl, Jr., Bruce G. Rockey, Donald D. Eggleston, and Walter W. Jacobe.

FIELD OF THE INVENTION

This invention relates in general to coating, and more particularly, the invention concerns improved equipment for coating photographic media, such as film and paper, incorporating reliable bar coding apparatus having printer means controlled by computer readable medium.

BACKGROUND OF THE INVENTION

A widely used practice of labeling web, such as photographic film and paper, during coating is to manually apply adhesive, magnetic labels to a non-coated edge of the web. Labeling is generally required during coating of photographic media so as to identify the location of the start and finish of a "good" coated part. Typically, a coating operator would use a white light flashlight to apply the labels on alternating sides of the media or web during the first pass in which part changes are made; subsequent passes then utilize a magnetic detection alarm system to make the coating operator aware of the imminent presence of a "good" coated part at the coating hopper. However, the present labeling technique has several shortcomings. On the one hand, experience has shown that labels applied in the manner discussed tend to fail because of failure of the adhesive material. As a result the ability to distinguish between coated parts is lost. Another shortcoming of the existing practice for labeling photographic media during coating is that since the labeling must be done in the dark because of the photosensitivity of the media, there exists the possibility of media fogging due to the white light flashlight.

An even more significant shortcoming of current practice for labeling media is that it is virtually impossible for an operator to manually position a label at the precise location along the media when the media is advancing through the coating process at very high speeds exceeding about 90 ft/min.

In more advanced coating equipment, the use of a so-called Advanced Fluid Delivery System (AFD) system has created additional concerns and/or intensified existing ones. AFD coatings are shorter in length resulting in a larger number of coatings, and a coating operator would need to stand at the coating station for prolonged periods to apply the labels to the web at a much greater frequency (every minute over several hours). This could lead to a repetitive motion injury, and at the very minimum will keep the coating operator from being able to focus on other tasks.

Moreover, AFD coatings are generally shorter and therefore can less afford the potential of fogging at the start and end of the "good" part that may come with the physical labeling method.

Therefore, a need persists for an apparatus that can automatically apply bar code indicia to photographic media traveling at high speeds that is reliable, easy to use, and precisely locates the desired labeling position on the media without operator intervention.

SUMMARY OF THE INVENTION

It is, therefore, an object of the invention to provide equipment for coating photographic media that also provides means for printing bar code indicia on a lateral edge of the media.

Another object of the invention is to provide equipment for coating photographic media that uses ink jet printers for printing human readable and machine readable indicia on a lateral edge of the coated photographic media.

It is a feature of the coating equipment of the invention that a printer means for printing bar code indicia on a lateral edge of coated photographic media is operably controlled by a controller having computer readable media that directs the movement of the printer means and the printing of predetermined bar code messages on the coated media.

To overcome one or more problems in the prior art, there is provided equipment for coating photographic media which includes a reservoir containing a suitable photographic coating solution and a source of photographic media. Means is provided for advancing the photographic media from the source so as to be exposed to the coating solution. Further, printer means is provided for printing indicia on the photographic media. A linear slide mechanism is provided to position the printer means for printing along a lateral edge of the photographic media. A controller is provided for controlling the printer means. The controller has computer readable medium for directing the linear slide mechanism to position the printer means along the photographic media and to direct the printer means to print predetermined bar code indicia on a lateral edge of the photographic media. A bar code reading means is provided to verify the printing by reading the bar code indicia just after it has been printed on the photographic media.

It is an advantage of the coating equipment of the invention that bar code indicia can be placed on a coated web without operator intervention. Moreover, it is an advantage of the invention that bar code indicia can be applied reliably at a precise location along the coated web. Further, another advantage of the invention is that the speed of the moving web does not effect the reliability of the bar code apparatus integrally associated with the coating equipment.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein.

DETAILED DESCRIPTION OF THE INVENTION

Figure 1:
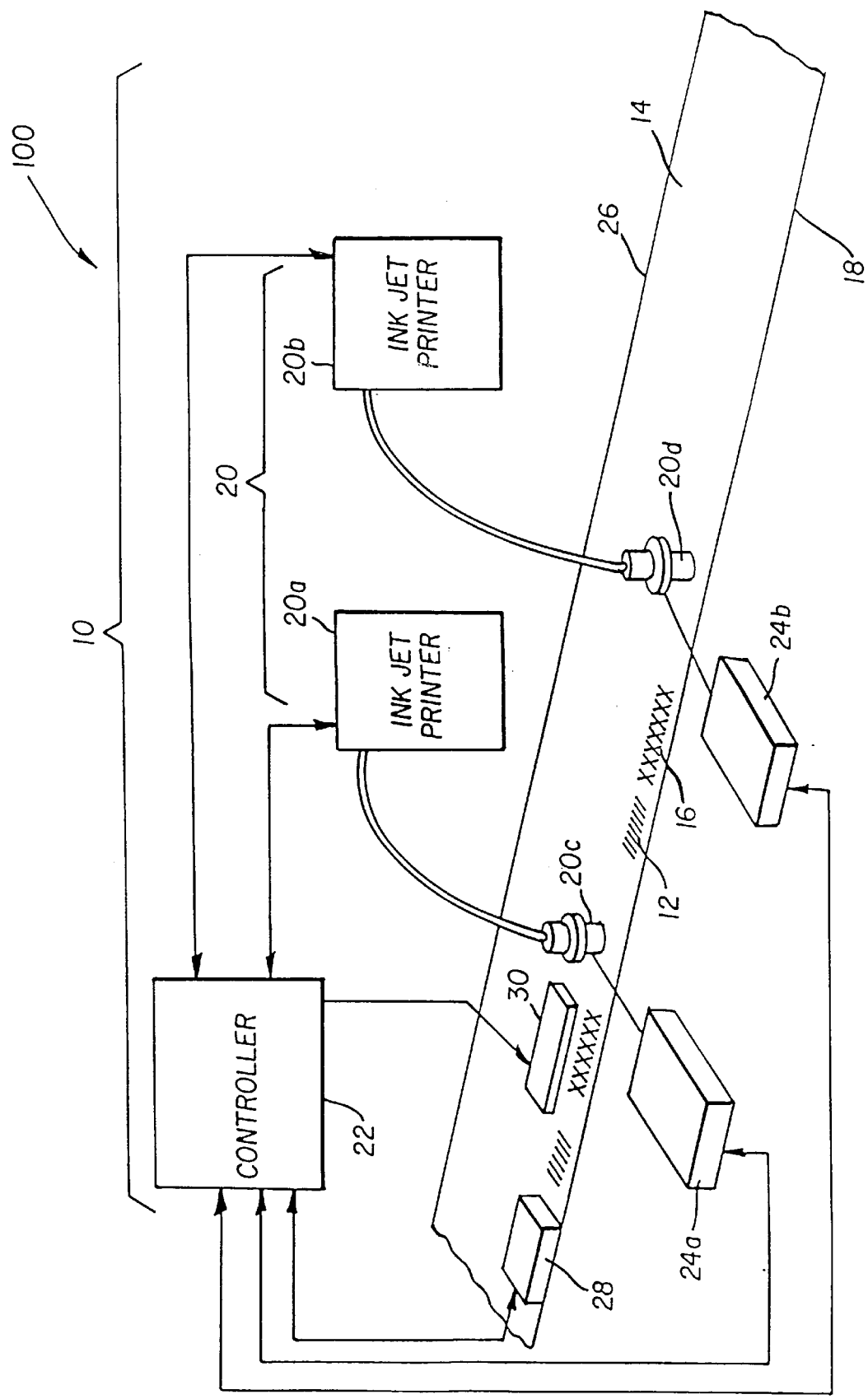
FIG. 1 is a schematic of the bar coding system associated with the coating equipment of the invention.
Figure 2:
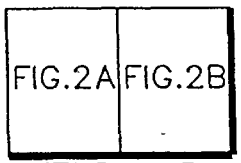
FIGS. 2A and 2B are a schematic of the edgemarking system associated with the coating equipment of the invention.
Figure 2A:
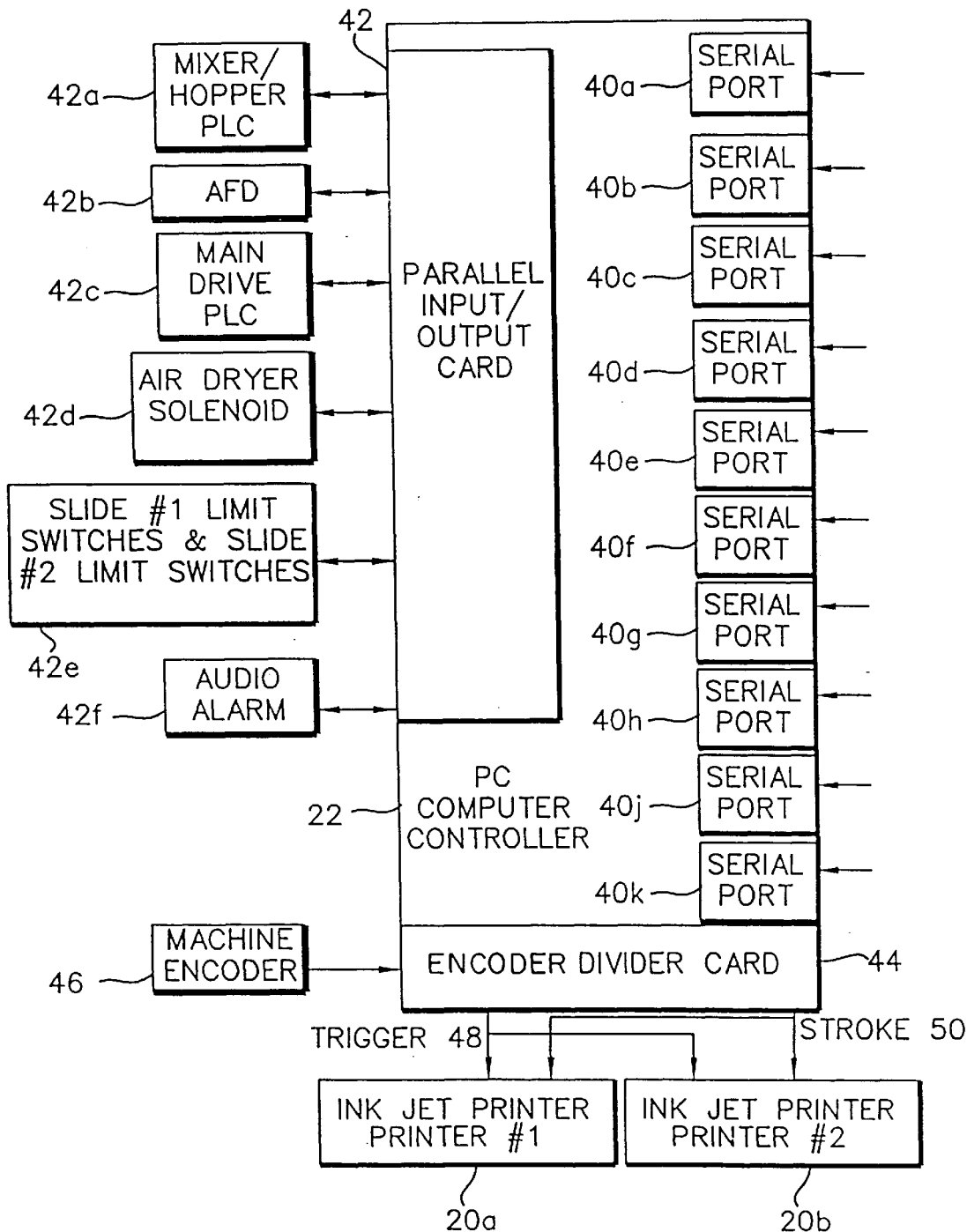
Figure 2B:
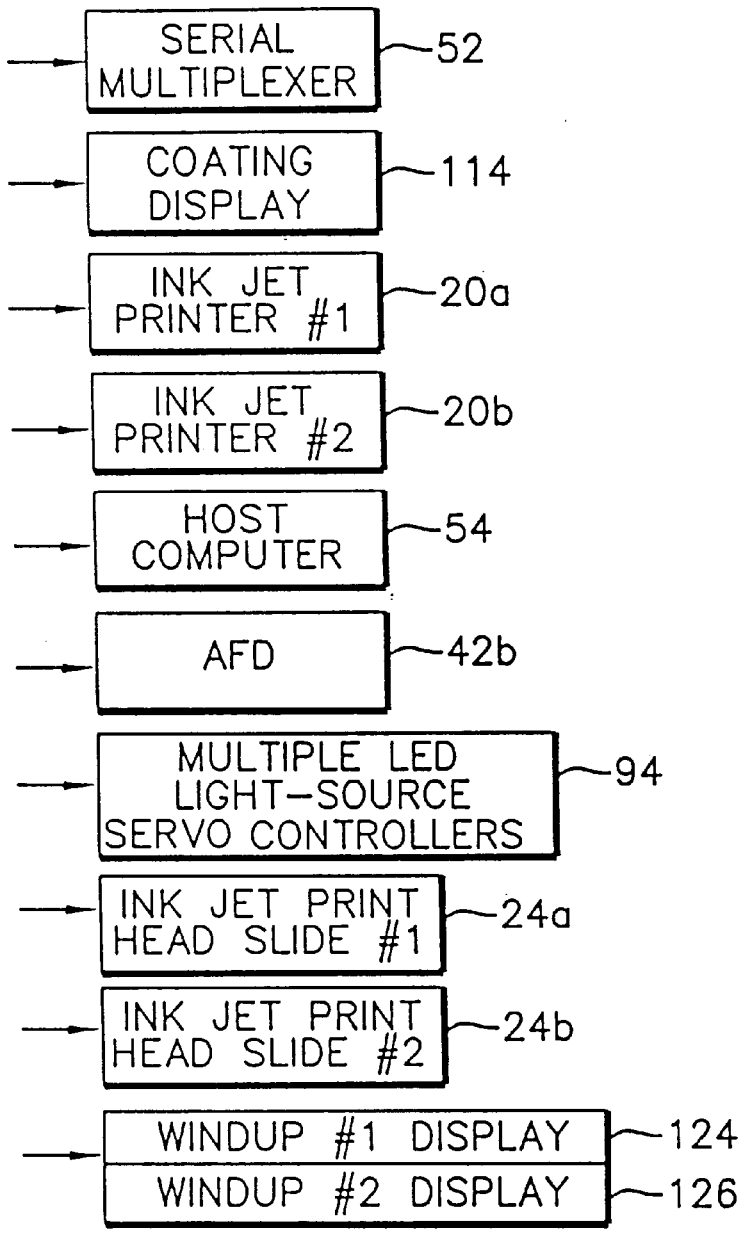

Turning now to the drawings, and particularly to FIGS. 1 and 2A and 2B, bar coding apparatus 10 integrally associated with coating equipment 100 (FIG. 4) of the invention is illustrated. Broadly defined, coating equipment 100 of the invention (described more fully below) for coating photographic media (web) 14, such as film and paper, includes a source of web (unwind 130, shown in FIG. 4), reservoir containing a coating solution (not shown), means for exposing the photographic media to the coating solution (not shown) and, importantly, apparatus 10 for printing bar code indicia 12 on a moving web 14.

According to FIG. 1, apparatus 10 has a printer means 20, preferably a pair of ink jet printers 20*a* and 20*b* (described below) arranged for printing lengthwise along a lateral edge 18 of the web 14. A controller 22 is provided for controlling the printer means 20.

Referring again to FIG. 1, controller 22 has a computer readable medium (described fully below) for positioning ink jet printer heads 20*c* and 20*d* so as to print predetermined bar code indicia 12 along the lateral edge 18 of the web 14.

With further reference to FIG. 1, apparatus 10 can thus mark and record human readable indicia 16 as well as machine readable or bar code indicia 12 that identifies the location of different experimental coatings along the length of web 14. Apparatus 10, therefore, satisfies an important need for a reliable marking system associated with coating equipment 100 of photographic media, that is, a system having numerous redundant safeguards such as redundant ink jet printers 20*a* and 20*b* and multiple bar code readers at each bar code read station 28.

Turning to FIGS. 2A and 2B, controller 22 is preferably a personal computer (PC) loaded with computer readable media written preferably in a high level language such as Microsoft QuickBasic™. The computer readable media directs and signals the controller 22 for controlling apparatus 10. Ten serial ports, designated 40*a*–40*k*, and a parallel input/output card 42 allow the controller 22 to send and receive information to and from various pieces of equipment. One serial port 40*e* is interfaced to a host computer 54. Another serial port 40*f* is used to send information to the "AFD" machine 42*b*. Various parallel input/output signals from the parallel input/output card 42 are received or sent to or from the mixer/hopper PLC 42*a*, AFD machine 42*b*, main drive PLC 42*c*, audio alarm 42*f*, air dryer solenoid valve 42*d*, and slide limit switches 42*e*.

Referring again to FIGS. 2A and 2B, an encoder divider card 44, located in the PC or controller 22, receives a digital encoder signal from a coating machine encoder 46. This digital signal, which has a resolution of approximately 50,000 pulses per foot, indicates the exact movement of the web 14. Based on this input signal the encoder divider card 44 can precisely output two signals based on the movement of the web 14. One signal, ink jet trigger 48, initiates the printing of the last message received by the ink jet printers 20*a* and 20*b*. The signal generated by ink jet trigger 48 occurs for each foot of web 14 movement and is sent to the ink jet printers 20*a* and 20*b*. A signal from ink jet trigger 48 is also provided internally to the controller 22. The second signal, ink jet stroke signal 50, indicates to the ink jet printers 20*a* and 20*b* when to print each stroke of the messages in the form of machine readable and human readable indicia 12, 16. Ink jet stroke signal 50 has a resolution of approximately 0.014 inches of web movement per output pulse.

Referring once again to FIG. 1, as indicated, ink jet printers 20*a* and 20*b*, mark the web 14 with machine readable indicia 12 and human readable indicia 16. Ink jet printers 20*a* and 20*b* are preferred because of their ability of non-contact marking at high speed with variable data. Ink jet printers 20*a*, 20*b* mark with a solvent-based, non-photoactive ink containing carbon which allows for the reading of the machine readable indicia 12 with infrared light. The solvent-based ink does not dry fast enough so air is blown across the machine readable indicia 12 and the human readable indicia 16 to aid in the drying using an air dryer 30. The switching of the air on/off is controlled by the PC or controller 22 from parallel input/output card 42 through one of the digital output lines 42*d*. Two ink jet printers 20*a* and 20*b* are preferred because they provide high system reliability.

Referring to FIGS. 1, 2A and 2B, each ink jet printer 20*a*, 20*b* has a print head 20*c*, 20*d*, respectively, which are spatially separated, preferably about six inches apart. Print heads 20*c*, 20*d* prints substantially the same predetermined indicia 12, 16 on the web 14, except for an identifier or discriminator marking that enables differentiation between the ink jet printers 20*a*, 20*b*.

Referring to FIGS. 2A and 2B, ink jet printer 20*a*, 20*b* are each interfaced to the computer 22 via serial ports 40*c* and 40*d*, respectively. Through the printer serial ports 40*c* and 40*d*, data or indicia 12, 16 to be printed on web 14 is downloaded to the ink jet printers 20*a* and 20*b* and printer status can be requested and received.

Referring back to FIG. 1, high resolution motorized linear slides 24*a*, 24*b* operably connected to printer heads 20*c*, 20*d*, respectively, precisely position printer heads 20*c*, 20*d* for locating indicia 12, 16 on a predetermined position along the outboard lateral edge 18 of web 14. Computer 22 via signals from serial interfaces 40*h* and 40*j* (FIGS. 2A–2B) which connects with linear slides 24*a*, 24*b* controls the exact positioning of the print heads 20*c* and 20*d* over the web 14. In our invention, when the printers 20*a*, 20*b* are not printing, the linear slides 24*a*, 24*b* are set to a home position which positions the print heads 20*c* and 20*d* away from the web 14. Sensors (not shown) located on linear slides 24*a*, 24*b* sense the print position of each print head 20*c*, 20*d* and give the computer 22 feedback via digital input lines 42*e* from slide limit switches (FIGS. 2A–2B) as to when the print heads 20*c*, 20*d* are in their proper print position.

Figure 3:
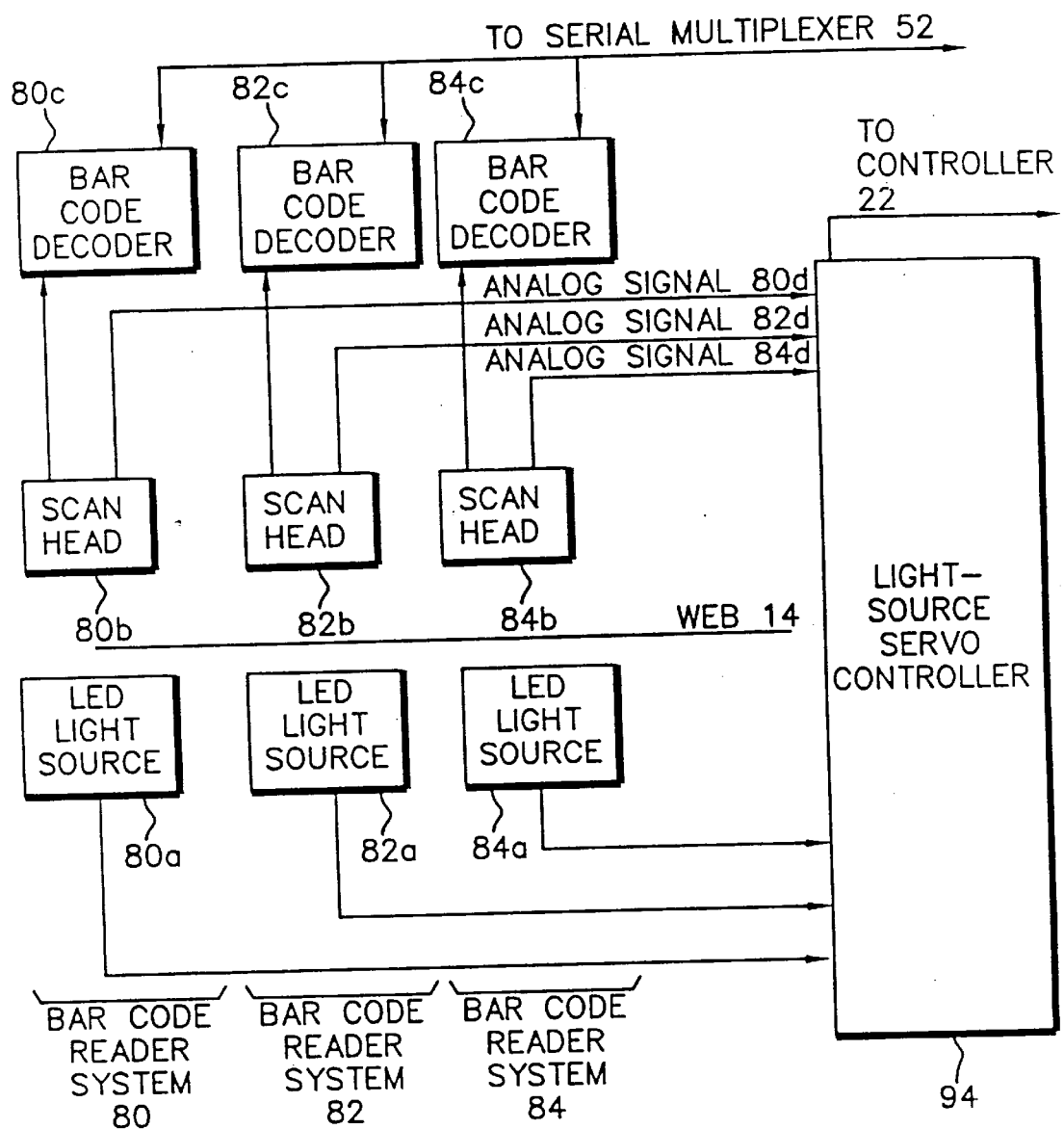
FIG. 3 is a diagram of the bar code station.
Figure 4:
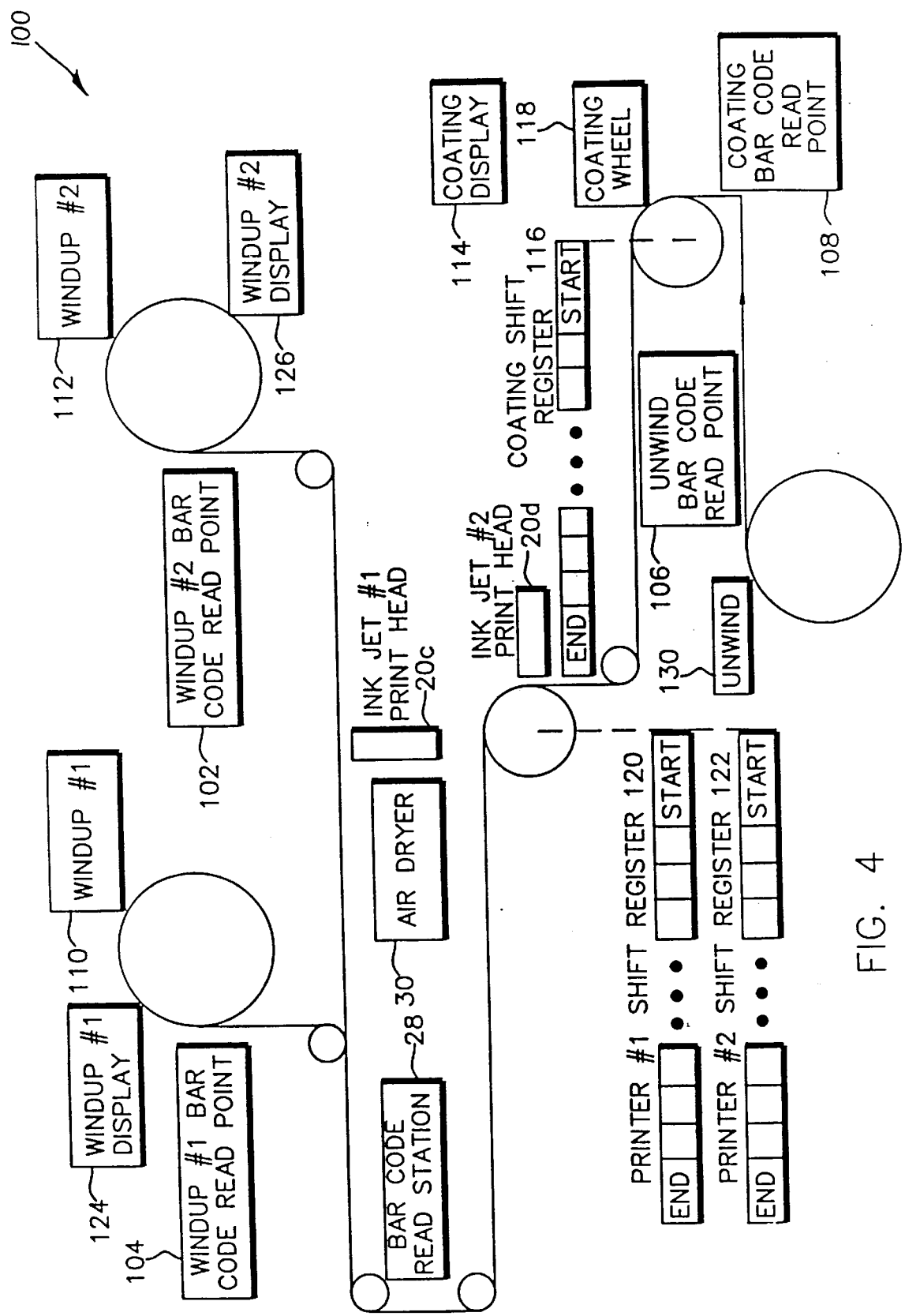
FIG. 4 is a schematic of the coating equipment of the invention.

Referring to FIGS. 1, 3 and 4, some of the information printed on the web 14 is in a machine readable format, namely bar code symbols or indicia 12. To ensure the readability of the printed bar code indicia 12, a bar code read station 28 (described in U.S. patent application, Ser. No. 09/059,719, hereby incorporated herein by reference) was developed and located in proximity to ink jet print heads 20*c* and 20*d*. According to FIG. 3, bar code read station 28 consists of preferably a first, second, and third reader system 80, 82, 84, respectively. Each bar code reader system 80, 82, 84 includes, respectively, a bar code decoder 80*c*, 82*c*, 84*c*, a fixed mount fixed beam scan head 80*b*, 82*b*, 84*b*, and a LED light source 80*a*, 82*a* and 84*a* for use with a fixed mount fixed beam scan head 80*b*, 82*b*, 84*b*. A special LED light-source servo controller 94 (described in U.S. patent application, Ser. No. 09/059,719) is used with the bar code reader systems 80, 82, 84. LED light sources 80*a*, 82*a*, 84*a* associated with each of the scan heads 80*b*, 82*b*, 84*b*, are arranged on opposite sides of the web 14 from the scan heads 80*b*, 82*b*, 84*b* so the scan heads 80*b*, 82*b*, 84*b* and light sources 80*a*, 82*a*, 84*a* work in a transmissive mode, i.e., a through-beam configuration. Moreover, LED light sources 80*a*, 82*a*, 84*a* each has an output at an infrared wavelength so as to not expose a sensitized web. Due to the variation in optical densities across a typical web or photographic material run on the coating machine (approximate density range of 0.005 to 2.0), a bar code reader light-source servo system 94 is used in connection with apparatus 10. The outputs of the LED light sources 80a, 82a, 84a are automatically changed via the light-source servo system 94 based on the analog output signals 80d, 82d, 84d of the bar code reader scan heads 80b, 82b, 84b. This enables the bar code reader scan heads 80b, 82b, 84b to operate at their optimum illumination level for which they were designed to operate. Each of the three scan heads 80b, 82b, 84b with their respective light sources 80a, 82a, 84a are mounted on a fixture so each scan head 80b, 82b, 84b scans a different path on the web 14. These unique scans along different paths on the web allow for more misregistration of a bar code in reference to the reader assembly and also allows the assembly to use the vertical redundancy of the bar code.

Referring now to FIGS. 1 and 4, in order to retrieve data in the bar code symbol or indicia 12, multiple bar code read points are located along the web 14. According to FIG. 4, coating equipment 100 includes unwind bar code read point 106 and coating bar code read point 108 which are located upstream of the ink jet printers 20a, 20b and others, windup #1 bar code read point 104 and windup #2 bar code read point 102, after the ink jet printers 20a, 20b. Read points 102, 104 arranged downstream of the ink jet printers 20a, 20b can read the bar codes symbols or indicia 12 on the first or multiple passes of the web 14 through the coating equipment 100 (only portion shown). Read points 106, 108 arranged upstream of the ink jet printers 20a, 20b read the bar code symbols or indicia 12 on subsequent passes of the web 14 after the initial print pass of the web 14 through the machine. Bar code read points 102, 104, 106, 108, consists of two bar read stations (see description above), one located at each lateral edge 18, 26 of the web 14 such that no matter whether the bar code symbols or indicia 12 are located on either lateral edge 18, 26 a bar code read station will be able to read the bar code symbols 12. In coating equipment 100, bar code read station 28 and bar code read points 102, 104, 106, 108 are interfaced to the computer 22 via a serial multiplexer 52 (shown in FIG. 3).

System Operation

In operation, when using the coating equipment 100 integrally incorporating bar coding apparatus 10 (described above), certain prescribed inputs constituting a recipe from the host computer 54 via a serial port 40e is downloaded to the PC 22. Typically, these inputs will include the following: experiment number (four digits); indicator whether AFD is to be used; lowest coating part number used in experiment (three digits); highest coating part number used in experiment (three digits); and, additional data for each pass of the web through the coating machine.

A typical web 14, such as photosensitive paper or film, can have a maximum of eight passes through the coating machine. Data for each pass includes, for instance: start coating part number (three digits); first coating part number to be ink jet printed (three digits); last coating part number to be ink jet printed (three digits); a thread-up code to indicate the distance between the coating wheel 118 and the ink jet print heads 20c, 20d; and, an indicator as to which of two windups, 110, 112, will be used. After the recipe has been downloaded, any of the downloaded data can be edited with the resident recipe editor. The following additional data can also be edited: leading footage (the length of web ink jet printed web before the start of the first "good" coating) and the trailing footage (the length of ink jet printed web after the last "good" coating has been completed). When the data is edited, the editor checks some of the data and only allows valid data to be saved. After the download or editing of a recipe, the PC 22 automatically inputs the following additional data: pass number from the mixer/hopper PLC via parallel lines 42a, "AFD is connected to PC" via a parallel input line from the AFD machine 42b, and a signal indicating whether the coating part number will be incrementing or decrementing from the mixer/hopper PLC via a parallel input 42a.

Based on the aforementioned data, the PC 22 makes several calculations and checks of the data. If a problem is detected an error message is sent to the coating display 114. Additional checks include the AFD connected line status 42b compared to the recipe AFD connect indicator, the pass number from the mixer/hopper PLC 42a is checked against the recipe to make sure that data is present in the recipe for the pass number, and the increment/decrement coating part number input from the mixer/hopper PLC 42a is compared to the results of a calculation based on the data for the pass number. Based on the data for the pass number, the PC 22 determines whether the pass is to be a bar code printing only pass, a bar code reading only pass, or a combination of bar code printing and bar code reading. If any bar code printing is to be done then the starting and ending coating part numbers of the parts to be printed are determined. For any bar code reading that is to be done on this pass, the starting and ending coating numbers of the parts to be read are determined. The web ID system allows for the ink jet printing on two different passes of the web through the coating machine.

Below are exemplary examples of the coating equipment 100 of the invention in operation:

EXAMPLE 1

Print Only Pass

With further reference to FIGS. 1, 2A, 2B, and 4, the following describes the sequence of events that occurs on a bar code print only pass. According to FIGS. 1 and 4, the PC 22 enables the bar code read station 28 and the appropriate windup bar code read station 102 or 104 and disables the other bar code read station 102 or 104 via their respective bar code reader light-source servo systems 94. The coating shift register 116 of coating equipment 100 is initialized to a length per the pass number thread-up code in the recipe. According to FIG. 4, coating shift register 116 tracks the coating part numbers and the "good"/"bad"/"abort" information from the coating wheel 118 to the ink jet print heads 20c and 20d. The coating display 114 is updated with the following data, for instance: coating part number, coating footage, "good"/"bad"/"abort" indication, pass number, experiment number, print mode indicator, first coating part number to print, last coating part number to print, and the indicator of the thread-up code. As shown in FIG. 1, the ink jet print heads 20c and 20d are positioned over the web 14 via the linear slides 24a and 24b. The PC 22 checks to make sure the slides 24a and 24b and print heads 20c and 20d are in their proper print position via microswitches through digital input lines 42e (FIG. 2). The PC 22 sends several initialization commands to each ink jet printer 20a and 20b. These commands ensure that the printers 20a, 20b are properly set up for their print tasks and ensures that printers 20a, 20b are ready to mark the web 14. If any one of the printers 20a, 20b does not respond to the initialization an error message is sent to the coater display 114. The PC 22 also prepares for the downloading of print data to each printer 20a and 20b. Following is an exemplary example of a format of each message to be printed by each printer 20a and 20b. Preferably, a message with a fourteen digit interleaved 2-of-5 bar code followed by human readable text is used. The bar code symbol or indicia 12 encodes the following data (listed in encoded sequence), for instance: machine number (one digit), experiment number (four digits), coating part number (three digits), indicator of coating status and which printer printed the message (one digit), and print footage (five digits). To track the coating status and which printer 20a, 20b printed a given message using a table like the one below is preferred:

|  | Ink Jet Printer #1 | Ink Jet Printer #2 |
| --- | --- | --- |
| "Good" Coating | 0 | 1 |
| "Bad" Coating | 5 | 6 |
| "Aborted" Coating | 7 | 8 |

The human readable text or indicia 16 contains the following data (listed in printed sequence), for instance: machine number (one digit); character indicating the direction of the next higher part number printed on the web (one character); experiment number (four digits); character indicating the direction of the next higher part number printed on the web (one character); coating part number (three digits); character indicating the direction of the next higher part number printed on the web (one character); indicator of coating status and which printer printed the message (one digit); character indicating the direction of the next higher part number printed on the web (one character); footage (five digits); character indicating the direction of the next higher part number printed on the web (one character); time of day (four digits—hours and minutes); character indicating the direction of the next higher part number printed on the web (one character); month (two digits); and year (four digits). The character indicating the direction of the next higher part number printed on the web is either of the ASCII characters 'greater than' (ASCII 62 decimal) or 'less than' (ASCII 60 decimal).

When coating equipment 100 starts running, the PC 22 senses this via an input line from the mixer/hopper PLC 42a. A signal from coating equipment 100, indicating that the coating machine is running, inhibits the editing of the recipe. Nothing happens until the PC 22 receives a good coating signal from either the mixer/hopper PLC 42a or the AFD machine 42b. When the web 14 starts moving, the encoder divider card 44 starts generating the ink jet trigger signal 48 and stroke signal 50. The PC 22 does nothing until it receives the ink jet trigger signal 48 and the first "good" coating signal. Upon receiving the first "good" coating signal and a trigger signal 48, the PC 22 then initializes the coating shift register 116 with the leading footage data. This consists of starting at the beginning of the shift register 116 (representing the coating wheel 118) and inserting special data into the shift register 116 that represents the leading footage that was in the recipe. The data entered in the register is a bad coating indicator and a special coating part number. The special coating part number is one less than the start coating part number if the incrementing mode is indicated in the recipe. The special coating part number is equal to the start coating number if the decrementing mode is indicated in the recipe. After this initialization, the coating shift register data 116 is shifted towards the ink jet printers 20a, 20b by one count.

With reference to FIGS. 2A, 2B and 4, on all subsequent print trigger signals 48 the following events occur. Data from the coating shift register 116 of coating equipment 100 is shifted towards the printers 20a, 20b by one position. The PC 22 updates the coating status and coating part number. The "good"/"bad"/"abort" coating status is determined by parallel input signals from the mixer/hopper PLC 42a and the AFD machine 42b. A "good" coating status is defined as either or both the mixer/hopper PLC 42a or the AFD machine 42b "good" coating parallel output lines being asserted. The mixer/hopper PLC "good" coating signal 42a is asserted when a coater presses the "good" coating button (not shown). The mixer/hopper PLC "good" coating signal 42a is not asserted when a coater presses the "bad" coating button (not shown). A "bad" coating status is defined when both the mixer/hopper PLC 42a and the AFD machine 42b "good" signals not being asserted. The mixer/hopper PLC 42a "abort" coating parallel output is asserted whenever the coater presses the "abort" coating button (not shown). When in the increment mode as defined by the recipe, the coating part number is incremented by one whenever the coating status goes from "bad" to "good". When in the decrement mode as defined by the recipe, the coating part number is decremented by one whenever the coating status goes from "good" to "bad". This updated data is entered into the first position of the shift register 116. Data that has been shifted to the end of the coating shift register 116 along with the machine number, experiment number, print footage and printer number are combined into a message and sent to the appropriate ink jet printers 20a and 20b. Also the bar coded print data are loaded into the appropriate printer shift registers 120 and 122 which tracks data between the ink jet printer 20a and 20b and the bar code read station 28. After the messages are sent to the ink jet printers 20a and 20b the print footage counter is incremented.

Referring to FIGS. 1 and 4, in coating equipment 100, when a bar code symbol or indicia 12 is read by the bar code read station 28, the PC 22 first determines which ink jet printer 20a or 20b printed the symbol and then checks in the appropriate printer shift register 120 or 122 for matching data. When matching data is found, the PC 22 removes the data from the shift register 120 or 122. If the read data does not match any data in a shift register 120 or 122 then the appropriate "bar code data not found" counter is incremented. When the data in the coating shift register 116 is shifted, the data in the printer #1 shift register 120 and printer #2 shift register 122 have their data shifted. After the shift has taken place the last position of each shift register 120 and 122 is checked for data. If data exists in the last position then the appropriate "bar code not read" counter is incremented. Also, a "missed bar codes in a row" counter is incremented and checked against a predetermined limit. If the limit is exceeded then an error message is sent to the coater display 114. When no data is found at the end of a printer shift register 120 or 122 then the appropriate "missed bar codes in a row" counter is reset.

According to FIG. 4, in coating equipment 100, the coater display 114 and the appropriate windup display 124 or 126 are updated. The coater footage is incremented by one or reset to zero whenever a "bad" to "good" coating status change occurs at the coating wheel 118. The appropriate windup display 124 or 126 shows what bar code data has been read at the windup bar code read points 102 and 104. Data displayed includes, for instance, the coating part number and "good"/"bad"/"abort" coating status as read by the bar code read points 102 and 104. A windup footage count is also displayed. The windup footage is incremented on each display update or reset to zero whenever the windup bar code read points 102 or 104 detects a "bad" to "good" coating status change at the windup 110 and 112. When the first bar code symbol is read at the windup stations 110 and 112, the PC 22 sets a "reading bar code at windup station" flag. The "reading bar code at windup station" flag is reset upon the windup station reading the first bar code symbol containing the last coating part number. When the "reading bar code at windup station" flag is set and no bar code symbol is read at the windup read stations 110 and 112, the PC 22 will automatically increment the windup footage and place a special indicator on the windup displays 124 and 126.

When ink jet printers 20a and 20b receive the ink jet print trigger signal 48 they immediately start to print data received. Each printer 20a and 20b upon completion of printing a message will send to the PC 22 a 'print done' response. The PC 22 checks each printer 20a and 20b to make sure that each printer 20a and 20b sends a 'print done' response for each message sent to the printers 20a and 20b.

Operators of coating equipment 100 have the ability to change the coating part number whenever the coating status is "bad" or "abort". This can be done from the coating display 114 or from the PC 22 keyboard.

The above sequence of events continue to take place until a coater has indicated a bad coating status on the last coating part number to ink jet print. With reference to FIG. 4, upon the transition to the "bad" status on this last part, the PC 22 will only continue to place data into the start of the coating shift register 116 data for the trailing foot count that is associated with this recipe. Ink jet printing of data will continue as long as there is data at the end of the coating shift register 116.

To assist in the monitoring of the experiment, several events and data are logged. Events are sent to the host computer 54 at the time they occur. Following is an exemplary list of events sent to the host computer 54: start good coating part, end good coating part, abort coating part, program error, both ink jet printers 20a, 20b had an initialization error, both ink jet printers 20a and 20b are down, ink jet printer 20a is not printing on web 14, and ink jet printer 20b is not printing on web 14. Addition data is logged by the PC 22 and then uploaded to the host 54 in a batch file. This data consists of, for instance, typical hardware status information.

In FIGS. 1, 2A and 2B, to assist in the drying of the ink on the web 14, an air curtain (not shown) generated by an air dryer 30 is blown on the web 14. The turning on and off of the air dryer 30 is controlled by the PC 22 via the air dryer solenoid 42d. The air dryer 30 is turned on when data is first loaded into the ink jet printers 20a, 20b and turned off after a predefined number of feet of web movement has taken place and no data has been loaded into the ink jet printers 20a, 20b.

EXAMPLE 2

Read Only Pass

Following describes a read only pass in which no ink jet printing takes place and only bar codes symbols 12 are read. Referring to FIG. 4, photographic media coated in coating equipment 100 and programmed for a read only pass, all bar code read points except the bar code read station 28 just after the ink jet printers 20a, 20b and one windup bar code read point 102 or 104 are used. The bar code read points in use include unwind bar code read point 106, coating bar code read point 108, and one winder bar code read point 102 or 104 as specified by the recipe for the given pass.

The PC 22 uses the bar code data from the unwind bar code read point 106 to generate two parallel output signals to the main drives PLC 42a. One signal is initiated when the coating status goes from "bad" to "good" and indicates the beginning of a "good" coating. The second signal is initiated when the coating status goes from "good" to "bad" and indicates the end of a "good" coating.

With further reference to FIG. 4, the coating bar code read point 108 supplies the data to the PC 22 for updating the coater display 114. Information displayed is the same as in a print pass other than the mode displayed is "read". During the read pass the coater will continue to press the "good" coating, "bad" coating, and "abort" coating buttons (not shown) just as in a print pass. The button pressing events along with the current data as supplied by the coating bar code read point 108 is sent to the host computer 54. Other status information is logged by the PC 22 as during a print pass. This data is uploaded to the host computer 54 at the end of the pass.

As depicted in FIG. 4, the appropriate windup display 124 or 126 is updated from its windup bar code read point 102 or 104 just as described above in a print only pass.

The same technique, as used at the windup bar code read points 102 and 104 during a print pass, is used during a read pass for each read point for incrementing the displayed footage. See the above description for the windup bar code read point 102 and 104 in the Print Pass example.

EXAMPLE 3

Print and Read Pass

Certain recipe configurations require that the ink jet printing be done during two passes. With reference to FIGS. 2A, 2B and 4, part of the printing is done on one pass and the other part on another pass. The PC 22 is able to, based on the recipe, determine exactly what is required for ink jet printing and printing/reading on each pass. On the read and print pass, the PC 22 knows if the ink jet printing will occur before or after the reading of bar codes that were printed on an earlier pass. The system will automatically pass from read to print or print to read mode. According to FIGS. 2A and 2B, PC 22 will automatically pass the event information during both the read and print modes to the host computer 54. Also status during the print and read modes will be logged and uploaded to the host computer 54 at the completion of the pass.

The same technique, as used at the windup bar code read points 102 and 104 during a print pass, is used during a print/read pass for each windup bar code read point 102 and 104 for incrementing the displayed footage. See the above description for the windup bar code read point 102 and 104 in the Print Pass Example.

The invention has been described in detail with particular reference to certain preferred embodiments thereof, but it will be understood that variations and modifications can be effected within the spirit and scope of the invention.

| PARTS LIST | |
|---|---|
| 10 | apparatus |
| 12 | bar code symbols or indicia |
| 14 | web |
| 16 | human readable text or indicia |
| 18 | one lateral edge of web 14 |
| 20 | ink jet printers |
| 20a | ink jet printer #1 |
| 20b | ink jet printer #2 |
| 20c | ink jet printer #1 print head |
| 20d | ink jet printer #2 print head |
| 22 | computer or PC |
| 24a | slide mechanism for ink jet printer #1 20a |
| 24b | slide mechanism for ink jet printer #2 20b |
| 26 | another lateral edge of web 14 |

-continued

PARTS LIST

| | |
|---|---|
| 28 | bar code read station |
| 30 | air dryer |
| 40a | serial port (a) to serial multiplexer 52 |
| 40b | serial port (b) to coating display 114 |
| 40c | serial port (c) to ink jet printer #1 20a |
| 40d | serial port (d) to ink jet printer #2 20b |
| 40e | serial port (e) to host computer 54 |
| 40f | serial port (f) to AFD 42b |
| 40g | serial port (g) to LED light-source servo controller 94 |
| 40h | serial port (h) to slide #1 24a |
| 40j | serial port (j) to slide #2 24b |
| 40k | serial port (k) to windup #1 display 124 and windup #2 display 126 and printer display (not shown) |
| 42 | parallel input/output card |
| 42a | parallel input/output lines to mixer/hopper PLC |
| 42b | parallel input/output lines to AFD |
| 42c | parallel input/output lines to main drive PLC |
| 42d | parallel output line to air dryer solenoid |
| 42e | parallel input lines from slide limit switches on slides #1 24a and slide #2 24b |
| 42f | parallel output line to audio alarm |
| 44 | encoder divider card |
| 46 | machine encoder |
| 48 | ink jet printer trigger signal |
| 50 | ink jet printer stroke signal |
| 52 | bar code reader serial multiplexer |
| 54 | host computer |
| 80 | first bar code reader system |
| 80a | LED light source |
| 80b | bar code scan head |
| 80c | bar code decoder |
| 80d | bar code scan head analog signal |
| 82 | second bar code reader system |
| 82a | LED light source |
| 82b | bar code scan head |
| 82c | bar code decoder |
| 82d | bar code scan head analog signal |
| 84 | third bar code reader system |
| 84a | LED light source |
| 84b | bar code scan head |
| 84c | bar code decoder |
| 84d | bar code scan head analog signal |
| 94 | LED light-source servo controller |
| 100 | Coating equipment |
| 102 | windup #2 bar code read point |
| 104 | windup #1 bar code read point |
| 106 | unwind bar code read point |
| 108 | coating bar code read point |
| 110 | windup #1 |
| 112 | windup #2 |
| 114 | coating display |
| 116 | coating shift register |
| 118 | coating wheel |
| 120 | ink jet printer #1 shift register |
| 122 | ink jet printer #2 shift register |
| 124 | windup #1 display |

-continued

PARTS LIST

| | |
|---|---|
| 126 | windup #2 display |
| 130 | unwind |

What is claimed is:

1. Equipment for coating photographic media, comprising:

a reservoir containing a coating solution;

means for exposing said photographic media to said coating solution;

printer means for printing indicia on said photographic media, said printer means being arranged for printing lengthwise along a lateral edge of said photographic media; and, controller for controlling said printer means, said controller having a computer readable medium for directing said printer means to move into position along said lateral edge of said photographic media and to print predetermined bar code indicia on said lateral edge, and wherein an encoder divider card integral to said controller senses and indicates exact movements of said photographic media, said encoder divider card producing a first output signal that triggers said printer means to print indicia on said photographic media and, a second output signal that directs said printer means to print portions of said indicia within a predetermined amount of web movement.

2. The equipment recited in claim 1 further comprising means operably associated with the controller for reading the indicia printed on the photographic media.

3. The equipment recited in claim 1 wherein said printer means comprises a pair of spaced apart inkjet printers, said inkjet printers being capable of marking said photographic media with machine readable and human readable indicia.

4. The equipment recited in claim 3 wherein said pair of ink jet printers each comprises a solvent-based ink containing carbon.

5. The equipment recited in claim 4 wherein an air drying means operably connected to and controlled by said controller is arranged about said photographic media to dry said solvent-based ink on said photographic media.

6. The equipment recited in claim 1 wherein each of said ink jet printers comprise a print head and means for identifying which one of said print heads printed certain indicia.

* * * * *